US010120093B2

(12) United States Patent
Le Calvez et al.

(10) Patent No.: US 10,120,093 B2
(45) Date of Patent: Nov. 6, 2018

(54) METHODS FOR IN-SITU BOREHOLE SEISMIC SURVEYS USING DOWNHOLE SOURCES

(71) Applicant: Schlumberger Technology Corporation, Sugar Land, TX (US)

(72) Inventors: Joel Herve Le Calvez, Houston, TX (US); Stewart Thomas Taylor, Farmers Branch, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 736 days.

(21) Appl. No.: 13/661,041

(22) Filed: Oct. 26, 2012

(65) Prior Publication Data

US 2014/0119159 A1     May 1, 2014

(51) Int. Cl.
G01V 1/00     (2006.01)
G01V 1/44     (2006.01)

(52) U.S. Cl.
CPC ...................... G01V 1/44 (2013.01)

(58) Field of Classification Search
USPC ......................................................... 367/25
See application file for complete search history.

(56) References Cited

U.S. PATENT DOCUMENTS

| 4,893,694 | A | * | 1/1990 | Houck et al. ................. 181/111 |
| 5,311,484 | A | * | 5/1994 | Anderson et al. ............. 367/38 |
| 5,596,548 | A | * | 1/1997 | Krebs ....................... G01V 1/28 |
| | | | | 367/56 |
| 2002/0185329 | A1 | * | 12/2002 | Goloshubin et al. ......... 181/111 |
| 2004/0122596 | A1 | * | 6/2004 | Sudhakar et al. ............... 702/17 |
| 2006/0106541 | A1 | * | 5/2006 | Hassan et al. ................... 702/6 |

(Continued)

FOREIGN PATENT DOCUMENTS

| WO | 2011/077223 | 6/2011 |
| WO | 2011/145985 | 11/2011 |

OTHER PUBLICATIONS

Soma, Nobukazu, Hiroaki Niitsuma, and Roy Baria. "Reflection imaging of deep reservoir structure based on three-dimensional hodogram analysis of multicomponent microseismic waveforms." Journal of Geophysical Research: Solid Earth (1978-2012) 112.B11 (2007).*

(Continued)

*Primary Examiner* — Isam A Alsomiri
*Assistant Examiner* — Jonathan D Armstrong
(74) *Attorney, Agent, or Firm* — Sara K.M. Hinkley

(57) ABSTRACT

Methods for in-situ reservoir investigation by borehole seismic methods are provided using receiver(s) and a downhole source. The downhole source may be a microseismic event, and may be located relative to the receiver(s) in any configuration. The downhole source may also be a controlled source that is positioned in a reverse vertical seismic profile (RVSP) geometry with respect to the receiver(s). The methods may involve locating the receiver(s) in a first well (which may have any orientation, including vertical or horizontal), and locating the source in a monitoring well (which may have any orientation, including vertical or horizontal), such that the source in the monitoring well is positioned at a greater depth in the formation than the receivers in the first well.

5 Claims, 23 Drawing Sheets

(56) References Cited

U.S. PATENT DOCUMENTS

| | | | |
|---|---|---|---|
| 2009/0010104 A1* | 1/2009 | Leaney | 367/47 |
| 2010/0118653 A1* | 5/2010 | He et al. | 367/57 |
| 2011/0069584 A1* | 3/2011 | Eisner et al. | 367/99 |
| 2011/0090764 A1* | 4/2011 | Radtke et al. | 367/147 |
| 2011/0174490 A1* | 7/2011 | Taylor et al. | 166/308.1 |
| 2011/0273961 A1* | 11/2011 | Hu | 367/47 |
| 2012/0069707 A1 | 3/2012 | Meunier | |
| 2012/0092959 A1* | 4/2012 | Taylor et al. | 367/32 |
| 2012/0116680 A1 | 5/2012 | Fei et al. | |
| 2013/0146282 A1* | 6/2013 | Toms et al. | 166/250.03 |
| 2014/0083681 A1* | 3/2014 | Taylor | 166/250.1 |

OTHER PUBLICATIONS

Tempress. Seismic-While-Drilling Source for Real-Time Pore Pressure Prediction. Phase II SBIR Final Report. U.S. Department of Energy Grant No. DE-FG03-01ER83111. TR-049. (Dec. 22, 2003).*

Van Dalfsen, W., et al. "A comprehensive seismic velocity model for the Netherlands based on lithostratigraphic layers." Netherlands Journal of Geosciences 85.4 (2006): 277.*

Reine, Carl, Mirko van der Baan, and Roger Clark. "The robustness of seismic attenuation measurements using fixed-and variable-window time-frequency transforms." Geophysics 74.2 (2009): WA123-WA135.*

Blackburn J, Daniels J, Dingwall S, Hampden-Smith G, Leaney S, Le Calvez J, Nutt L, Menkiti H, Sanchez A and Schinelli M: "Borehole Seismic Surveys: Beyond the Vertical Profile," Oilfield Review 19, No. 3 (Autumn 2007): 20-35.*

Perez, Marco Aburto, et al. "Meeting the subsalt challenge." Oilfield Review 20.3 (2008): 32-45.*

Pennington, Wayne D. "Reservoir geophysics." Geophysics66.1 (2001): 25-30. (Year: 2001).*

International search report for the equivalent PCT patent application No. PCT/US2013/066259 dated Jan. 23, 2014.

P. Breton et al., "Well Positioned Seismic Measurements," Oilfield Review, pp. 32-34, Spring, 2002.

Reservoir Stimulation (2000), Third Edition, M.J. Economides and K.G. Nolte (Eds), Chichester, UK, Wiley.

Warpinski, N.R. and Teufel, L.W. (1987) Influence of Geologic discontinuities on hydraulic fracture propagation, Journal of Petroleum Technology, 39, Aug. 2, 1987 pp. 209-220.

Jeffrey R.G., Byrnes, R.P., Lynch, P.A. and Ling, D.J. (1992) An Analysis of Hydraulic Fracture and Mineback Data for a Treatment in the German Creek Coal Steam, Paper SPE 24362, In Proceedings of the 1992 SPE Rocky Mountain, Regional Meeting, Casper, Wyoming, USA May 18-21, 1992, pp. 445 -457.

Jeffrey, R.G. Weber, C.R, Vlahovic, W, and Enever, J.R. (1994)Hydraulic Fracturing Experiments in the Great Northern Coal Seam, Paper SPE 28779 In Proceedings of the 1994 SPE Asia Pacific Oil and Gas Conference, Melbourne, Australia, Nov. 7-10, 1994 pp. 361-371.

Warpinski, N.R., Lorenz, J.C., Branagan, P.T., Myal, F.R. and Gall, B.L. (1993) Examination of a Cored Hydraulic Fracture in a Deep Gas Well, SPE Production and Facilities, 8, Aug. 3, 1993, pp. 150-158.

Waters, GT., Heinze, J., Jackson, R., Ketter, A., Daniels, J., and Bentley, D., (2006), Use of Horizontal Well Image Tools to Optimize Barnett Shale, In Proceedings of Reservoir Exploration SPE Annual Technical Conference and Exhibition, San Antonio, TX, USA Sep. 24-27, 2006.

Fisher, M.K., Wright, C.A., Davison b.m., Goodwin, A.K., Fielder, E.O. Buckler, W.S. and Steinsberger, N.P. (2005) in the Barnett Shale, "Integrating Fracture Mapping Technologies," SPE Production and Facilities, 20, May 2, 2005, pp. 85-93.

Daniels, J., Water,s G., Le Calvez, J., Lassek, J. and Bentley D. (2007) "Contacting More of the Barnett Shale Through and Integration of Real-Time Microseismic Monitoring," Petrophysics, and Hydraulic Fracture design, In Proceedings of SPE Annual Technical conference and Exhibition, Anaheim, California, USA Nov. 11-14, 2007.

Stewart, L., Jones, M., Martinez Pereira, A., and Tulett, J. (2010) "Geophysical principles of borehole seismic data," In Fundamentals of Borehole Seismic Technology, A Martinez Pereira and M. Jones (Eds), pp. 5-29 Sugar Land.

* cited by examiner

METHODS FOR IN-SITU BOREHOLE SEISMIC SURVEYS USING DOWNHOLE SOURCES

FIELD

The present disclosure relates to the study of underground formations and structures, for example as it relates to oil and gas exploration. The present disclosure relates more specifically to seismic surveying of subterranean geological formations.

BACKGROUND

Borehole seismic investigation and sonic logging are among the tools oil and gas professionals use to assist them in understanding formation properties. However, consistent with other technologies, these techniques face limitations in their implementation. For example, borehole seismic survey systems may involve sources located at the surface and receivers placed in the well: such methods can be wireline Vertical Seismic Profiling (VSP) type seismic acquisition, or Logging While Drilling (LWD) applications (such as the Schlumberger (SLB) Seismic LWD system). Other configurations are possible, for example the drill bit can function as the seismic source and receivers can be placed at the surface. In either case, the distance between source and receivers results in signal attenuation (especially for the high frequency content of the signal) and loss of resolution. Further, portions of the formation surrounding the well may not be visible using these conventional seismic methods and sonic logging techniques.

SUMMARY

The present disclosure provides borehole seismic methods which employ a downhole seismic source. The methods may enable acquiring velocity information which would otherwise not be obtainable using conventional VSP geometries, and/or may provide better quality data than may otherwise be obtainable with conventional VSP techniques where the source is located at the surface and/or where the controlled source has a more limited frequency range than some sources according to this disclosure.

In some embodiments, the methods involve using a microseismic event as a downhole seismic source, recording data relating to seismic waves generated by the microseismic event at at least one receiver, and interpreting at least a portion of the recorded data for information relating to subsurface structural features (other than or in addition to information relating to the microseismic event itself). The microseismic event can be natural, such as an earthquake, or induced such as by hydraulic fracturing. The subsurface structural features may be, for example, rock properties, reservoir properties or stratigraphic information. In some embodiments, the methods involve inducing at least one first microseismic event having a first spectral frequency content and inducing at least one second microseismic event having a second spectral frequency content, where the at least one first microseismic event is closer to the at least one receiver than the at least one second microsesimic event, and comparing the first and second spectral frequency contents for qualitative information relating to hydrocarbon content of the formation under investigation.

In some embodiments, the methods involve configuring sources and receivers downhole according to geometries providing seismic data for at least one portion of the formation that would otherwise not be visible if traditional VSP techniques are used with the source at the surface and receivers downhole. In some embodiments, the source and receivers are positioned downhole according to geometries that facilitate investigation of the formation over long distances, such as over the length of a horizontal well, or for example up to 12,000 feet (about 3658 meters), or for example up to 6,000 feet (about 1829 meters).

In some embodiments, the methods involve positioning receivers and a downhole source in a Reverse VSP geometry that is specifically chosen to generate seismic data for at least one portion of the formation that is not visible to a VSP geometry and/or a sonic logging tool. The source may be a controlled source or it may be a microseismic event. The RVSP geometry can be any RVSP geometry including RVSP checkshot, RVSP zero-offset, RVSP offset, and RVSP walk-away. In some embodiments, the method involves acquiring data at the at least one receiver relating to the at least one portion of the formation that are not visible to the VSP configuration and/or sonic logging tool and interpreting at least a portion of the data for information relating to subsurface structural features such as rock properties, reservoir properties and stratigraphic information.

In some embodiments, the methods involve positioning at least one receiver in a first well and positioning at least one source in a horizontal well. In further embodiments, the at least one source is positioned directly or indirectly below the at least one receiver, and the methods further involve initiating the at least one source, and acquiring seismic data at the at least one receiver. In some embodiments, the first well is a vertical monitoring well. In further embodiments, the first well is a vertical monitoring well and the at least one source is positioned at a vertical offset from the at least one receiver. In some embodiments, the first well is a horizontal monitoring well. In further embodiments, the first well is a horizontal monitoring well and the method further includes moving the at least one receiver to different positions in the monitoring well and initiating the at least one source at appropriate intervals to gather data at the different positions of the at least one receiver.

The identified embodiments are exemplary only and are therefore non-limiting. The details of one or more non-limiting embodiments of the invention are set forth in the accompanying drawings and the descriptions below. Other embodiments of the invention should be apparent to those of ordinary skill in the art after consideration of the present disclosure.

DESCRIPTION OF THE DRAWINGS

Certain embodiments of the present disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

Illustrative embodiments and aspects are described below. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having the benefit of this disclosure.

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Where ever the phrases "for example," "such as," "including" and the like are used herein, the phrase "and without limitation" is understood to follow unless explicitly stated otherwise.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Figure 1:
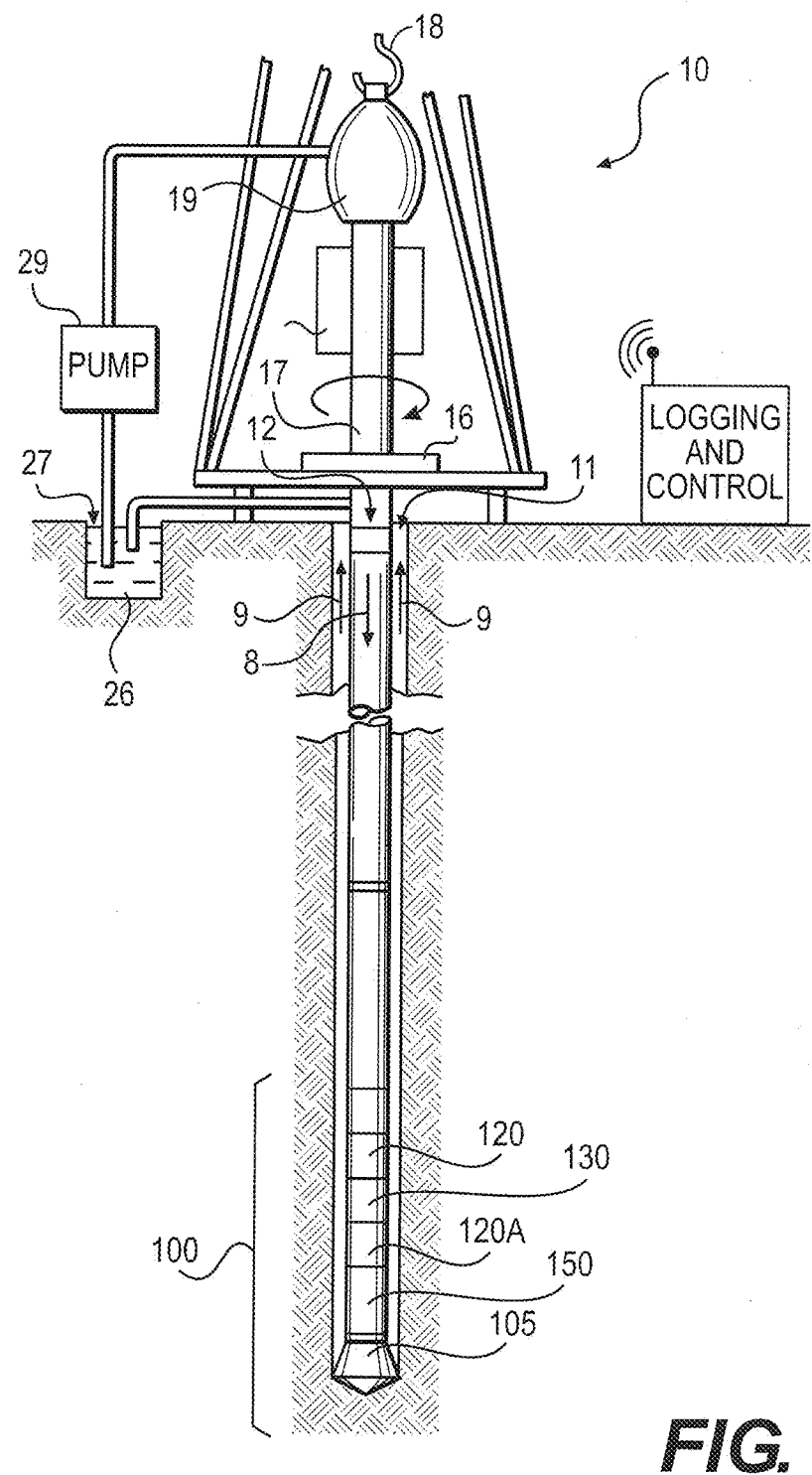
FIG. 1 is a schematic representation of an embodiment of a wellsite system compatible with the methods of this disclosure.
Figure 2A:
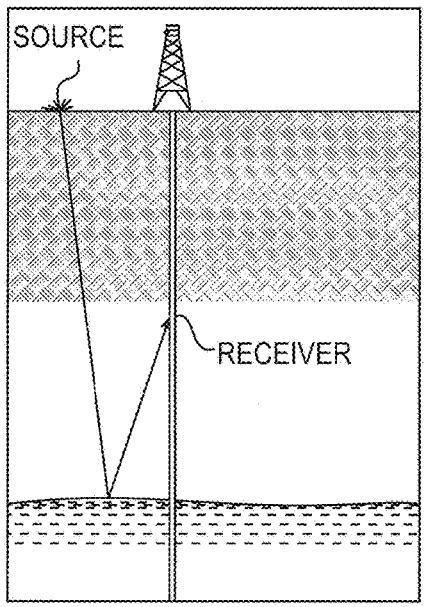
FIGS. 2a, 2b, 2c, 2d are schematic representations of several VSP survey configurations.
Figure 2B:
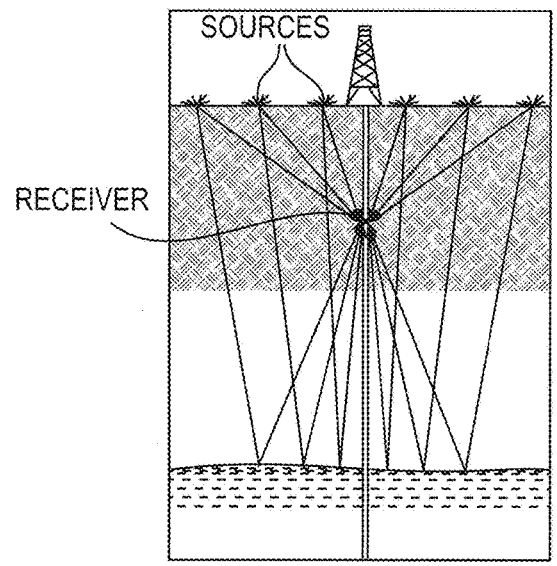
Figure 2C:
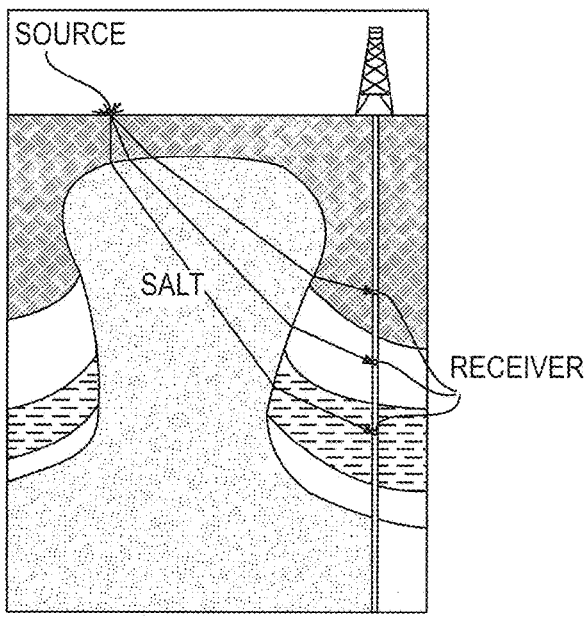
Figure 2D:
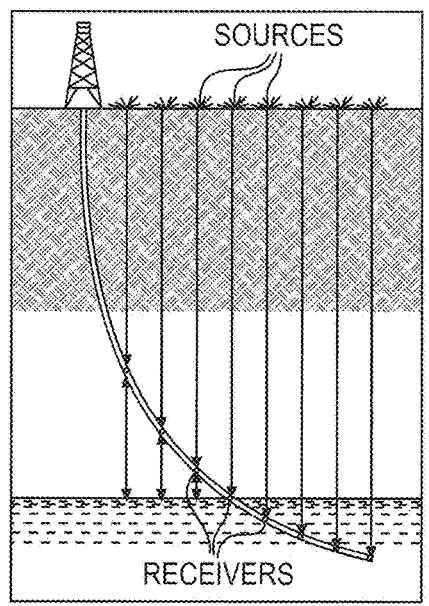

FIG. 1 illustrates a wellsite system in which the present disclosure can be employed. The wellsite can be onshore or offshore. In this exemplary system, a borehole 11 is formed in subsurface formations by rotary drilling in a manner that is well known. Embodiments can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a roto-steerable system and motor 150, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a seismic measuring device.

The MWD module 130 is also housed in a special type of drill collar, as is known in the art, and can contain one or more devices for measuring characteristics of the drill string and drill bit. For example, the MWD module may include one or more of the following types of measuring devices: a weight-on-bit measuring device, a torque measuring device, a vibration measuring device, a shock measuring device, a stick slip measuring device, a direction measuring device, and an inclination measuring device. The MWD tool further includes an apparatus (not shown) for generating electrical power to the downhole system. This may include a mud turbine generator powered by the flow of the drilling fluid, it being understood that other power and/or battery systems may be employed.

Borehole seismic surveys are among the most versatile of all downhole measurement techniques used in the oil field. The various types of waves generated and survey geometries achieved combine to deliver information relating to subsurface structural features such as for example reservoir depth, extent, heterogeneity as well about hydrocarbon content, rock mechanical properties, pore pressure, enhance-oil-recovery progress, elastic anisotropy, natural-fracture orientation and density, and induced-fracture geometry. Borehole seismic surveys, or VSPs, reduce the uncertainty of reservoir properties near the borehole. With their measurement scale between those of well logs and surface seismic surveys, VSPs extend near-wellbore observations, explore interwell volumes, and link time-based surface seismic imaged with depth-based logs.

FIG. 2 illustrates several VSP survey configurations. The VSP surveys enable interrogation of the earth to obtain among other things (i) a detailed velocity profile at the seismic scale which can be correlated to depth (log) and time (seismic) as well as (ii) some type of fracture image (e.g. walkaway, etc.).

FIG. 2 also illustrates a seismic-while-drilling tool which can be the LWD tool 120, or can be a part of an LWD tool suite 120A of the type disclosed in P. Breton et al., "Well Positioned Seismic Measurements," Oilfield Review, pp. 32-45, Spring, 2002. The downhole LWD tool can have a single receiver (as depicted in FIGS. 2A and 2B), or plural receivers (as depicted in FIGS. 2C and 2D), and can be employed in conjunction with a single seismic source at the surface (as depicted in FIGS. 2A and 2C) or plural seismic sources at the surface (as depicted in FIGS. 2B and 2D). Accordingly, FIG. 2A, which includes reflection off a bed boundary, and is called a "zero-offset" vertical seismic profile arrangement, uses a single source and a single receiver, FIG. 2B, which includes reflections off a bed boundary, and is called a "walkaway" vertical seismic profile arrangement, uses plural sources and a single receiver, FIG. 2C, which includes refraction through salt dome boundaries, and is called a "salt proximity" vertical seismic profile, uses a single source and plural receivers, and FIG. 2D, which includes some reflections off a bed boundary, and is called a "walk above" vertical seismic profile, uses plural sources and plural receivers.

In contrast to FIG. 2, the various techniques disclosed herein employ at least one downhole, rather than surface, source and may be utilized to facilitate and improve data acquisition and analysis in seismic monitoring of reservoirs as compared to the conventional VSP techniques where the source is at surface.

Methods: Downhole Controlled Source.

In some embodiments, the downhole source is a controlled source such as a ZTrak source, orbital source, or any other man-made source used to generate time-controlled P- and/or S-waves and the source-receiver configuration is according to a RVSP geometry. In most cases when dealing with traditional hydraulic fracture downhole-based monitoring operations, a velocity model is generated using sonic log-derived information obtained from either monitoring well(s), the treatment well(s) or some nearby (or not so nearby) well(s). Ideally, the velocity information encompasses the three zones of interest (i.e. where the hydraulically-induced fracture system develops, where the monitoring devices reside, and the zone in-between). But it is not uncommon for sonic information to only exist for a small portion of the formation, thus forcing one to either extrapolate sonic values in unknown zones or to create entirely off-the-shelf numbers based on either local knowledge, some type of neural network using potentially available logs, or just a simple guess.

Some embodiments according to this disclosure make use of downhole monitoring abilities combined with downhole controlled source abilities to generate velocity profiles and potentially fracture images where there is no information available. In some embodiments, this is achieved by reversing the acquisition geometry of typical VSP borehole seismic surveys such as those exemplified in FIG. 2. These reverse VSP geometries are referred to herein as reverse vertical seismic profile (RVSP). However, this disclosure is not limited to RVSP geometries, but can utilize a wide variety of source-receiver configurations, for example to provide velocity information that would otherwise be unavailable using traditional surface VSP configurations.

Figure 3:
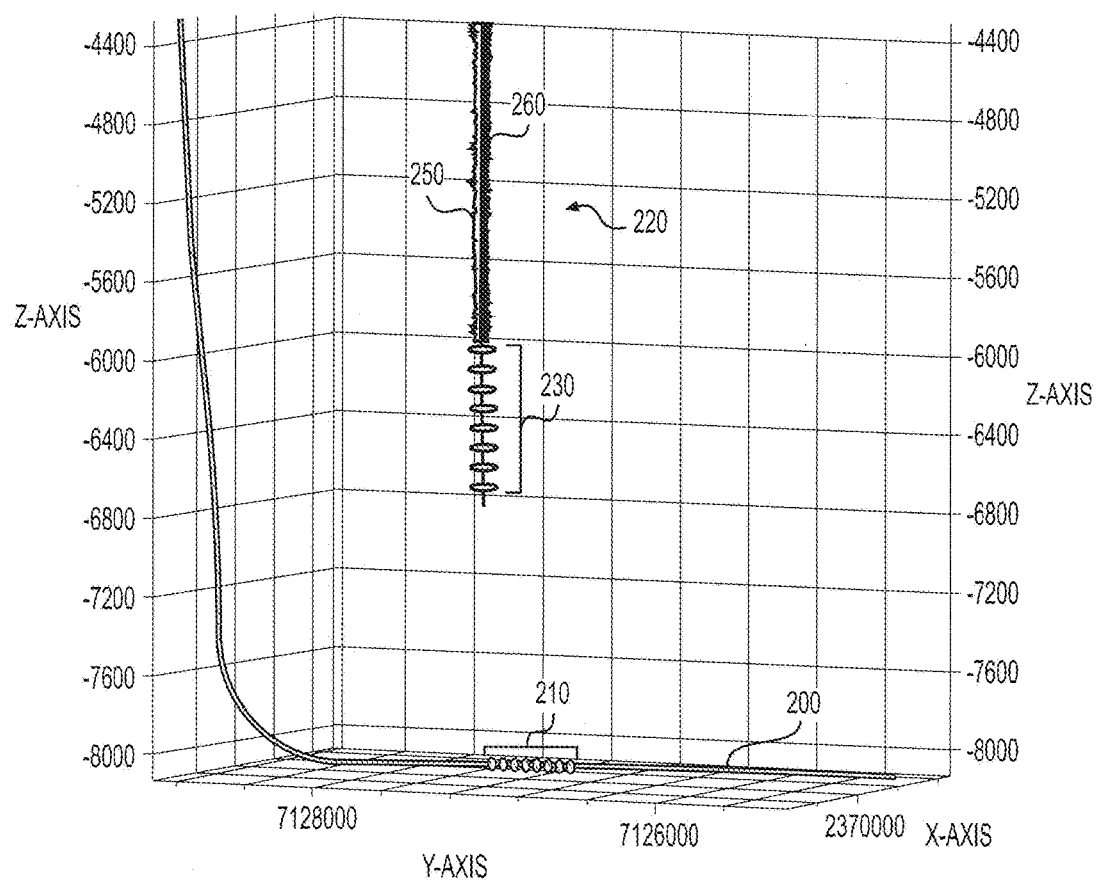
FIG. 3 illustrates an embodiment of a monitoring configuration where a nearby vertical array is used to monitor a treatment zone in a horizontal well, and which facilitates obtaining velocity information that would otherwise be obscured when using a traditional surface VSP survey configuration.

FIG. 3 illustrates an embodiment of an RVSP monitoring configuration where a nearby vertical array is used to monitor a treatment zone in a horizontal well. In particular, a horizontal well 200 with zone to be treated 210 is shown. Also shown are a vertical monitoring well 220 and monitoring devices 230. Also shown is velocity information from a sonic log with investigation depth, which stops just above the sensors 240, with a first curve 250 representing measured compressional sonic values and a second curve 260 representing measured shear sonic values. By contrast, in a scenario corresponding to that of FIG. 3, where a surface VSP technique is used (source is located at the surface as opposed to within the horizontal well), the depth interval between the bottom of the log and the lateral well contains no velocity information. Thus, a guess (educated or not) has to be made since a velocity model is needed to process data.

Figure 4:
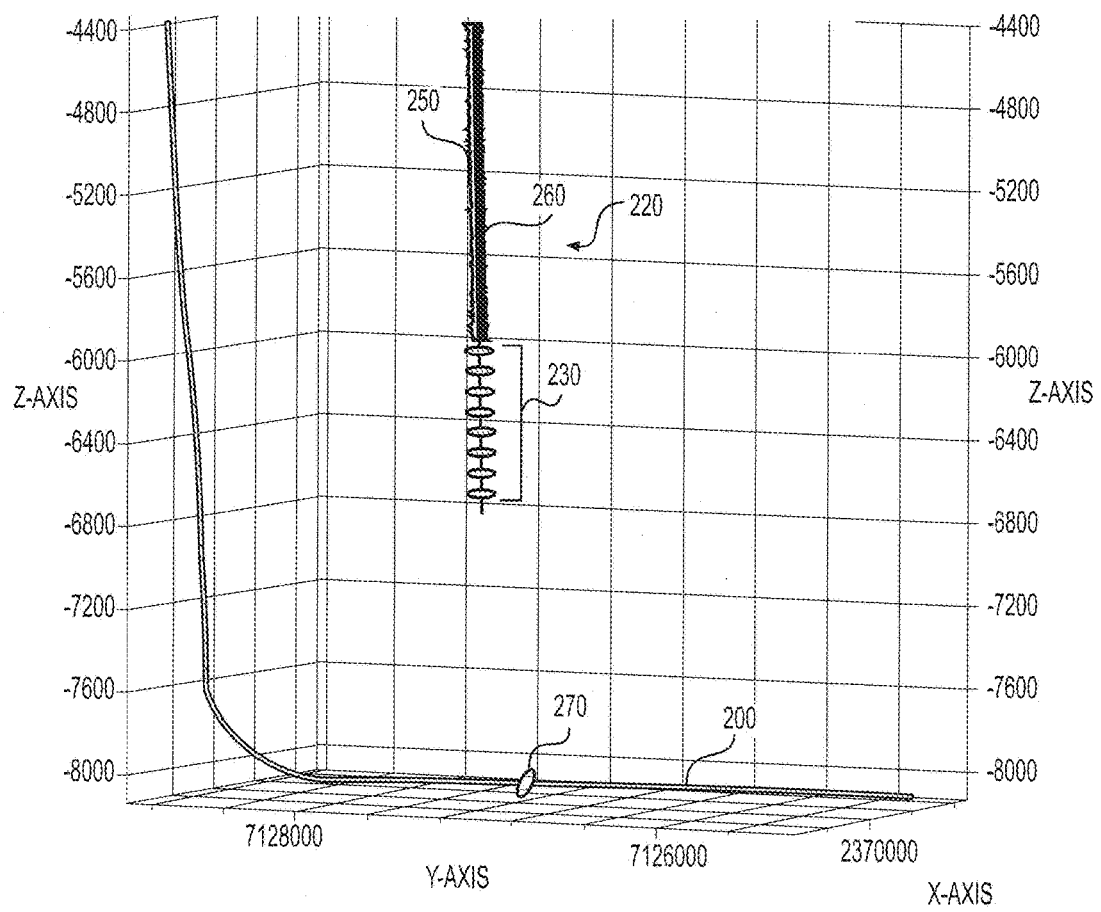
FIG. 4 illustrates an embodiment of an RVSP configuration according to this disclosure.

FIG. 4 illustrates an embodiment ("RVSP checkshot" and "RVSP zero-offset VSP") according to this disclosure for obtaining the missing velocity information, and specifically using a controlled downhole source (P-wave and/or S-wave) below the well (i.e., reversing the geometry of a checkshot survey). As shown in FIG. 4, the depth interval between the bottom of the sonic information and the lateral well has unknown velocity characteristics. In accordance with the particular embodiment, a downhole controlled source 270 is located within the lateral well 200 to be stimulated and slightly below the monitoring well 220 containing the geophone array 230 facilitating interrogation of the initially unknown zone. With this configuration, one could obtain, for example, time of first arrivals to receivers in the "RVSP" checkshot which information can be used as input: (a) to add velocity information in the zone which was initially not investigated, (b) to calibrate lateral continuity (or lack thereof) of the 'nearby' acoustic impedance log, (c) to calculate a synthetic seismogram, or (d) to calibrate the surface seismic data.

Figure 5:
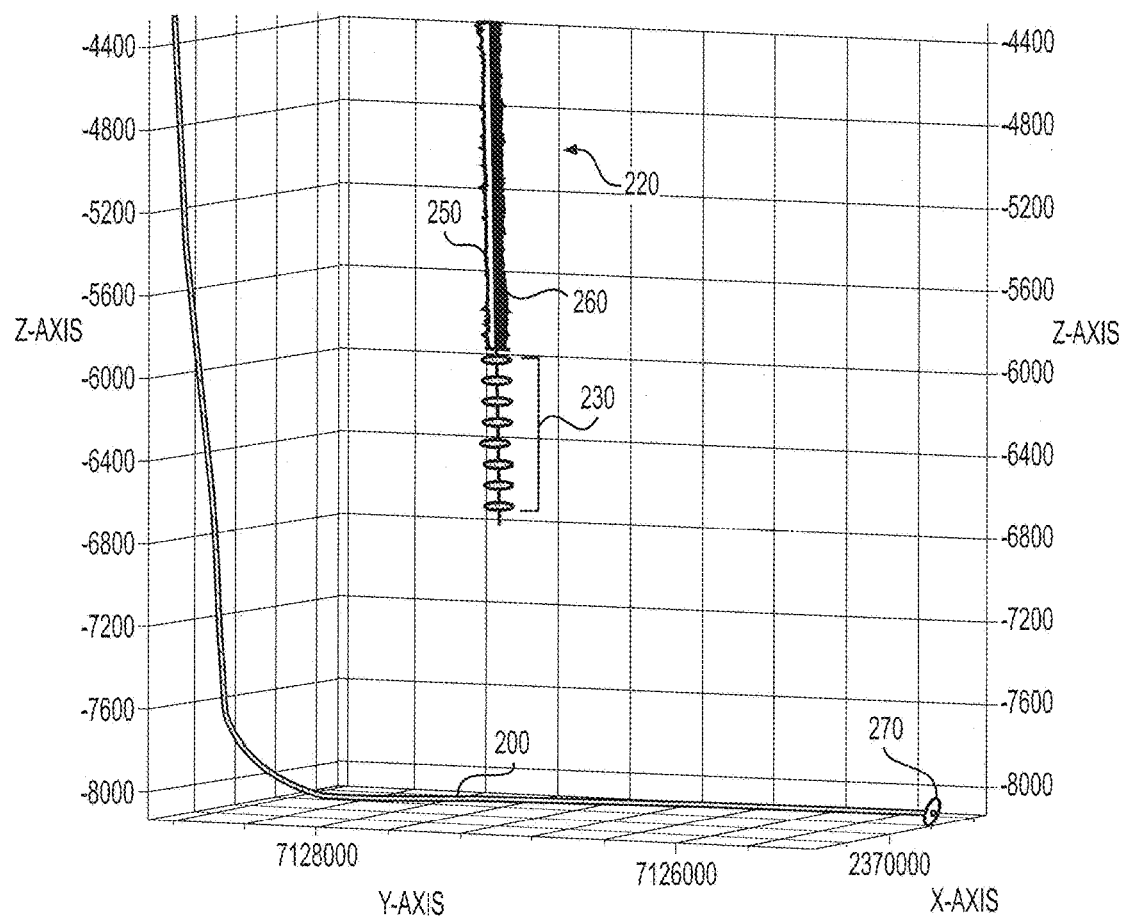
FIG. 5 illustrates another embodiment of an RVSP configuration according to this disclosure.

FIG. 5 illustrates another embodiment ("reversed offset VSP") according to this disclosure for obtaining missing velocity information, also using a controlled downhole source below the well. In the case of offset VSP, the depth interval between the bottom of the log and the lateral well contains no velocity information. Thus, again, a guess (educated or not) needs to be made. As shown in FIG. 5, the proposed geometry for interrogation of the previously unknown zone is to use a controlled downhole source 270 at an offset below the monitoring well 220 (i.e. mirroring the offset VSP survey) containing the receivers 230 but emitting controlled waves in various locations along the treatment well 200 trajectory or another lateral treatment well nearby to ensure proper offset value to produce a reverse offset VSP. According to this configuration, one could obtain first arrivals in the reverse offset VSP which information can be used as input: (a) to add velocity information in the initially unknown zone, (b) to calibrate lateral continuity (or lack thereof) of the 'nearby' acoustic impedance log, (c) to calculate a synthetic seismogram, or (d) to calibrate the surface seismic data.

Figure 6:
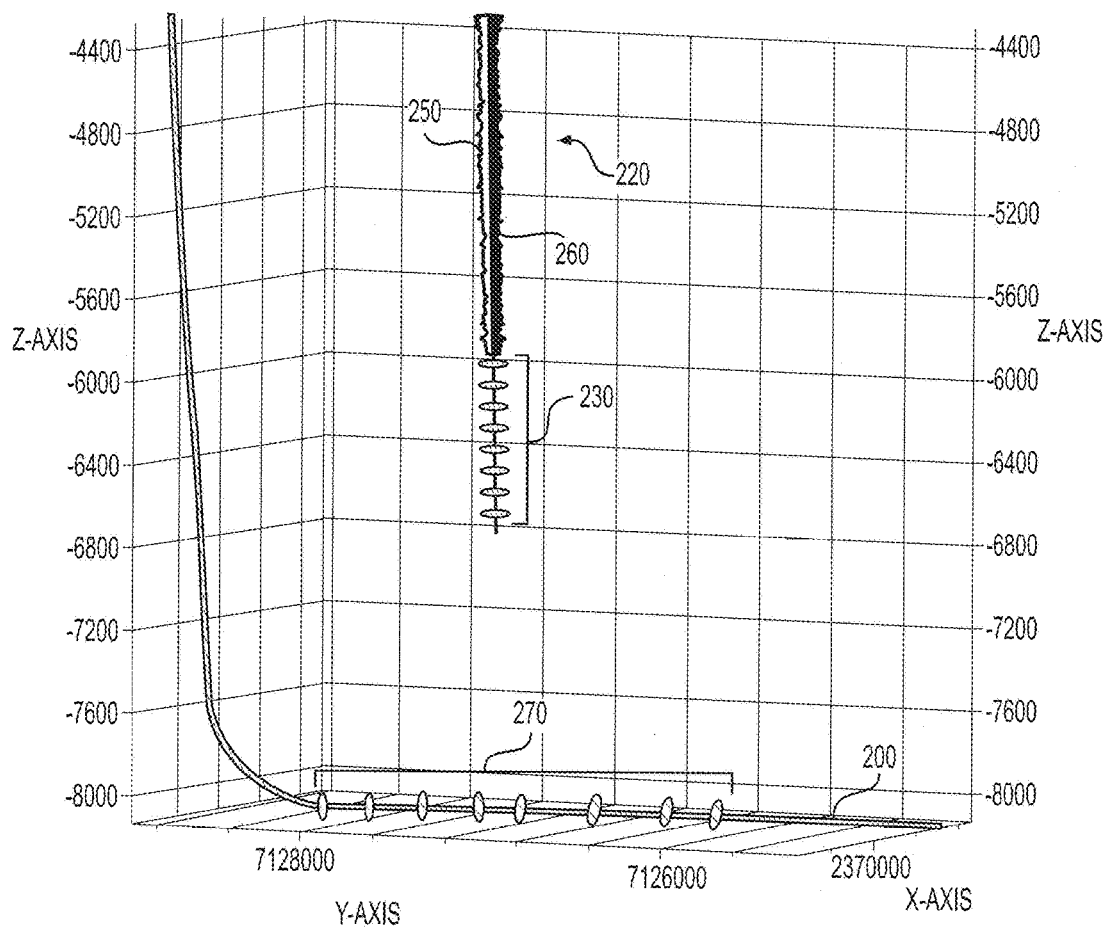
FIG. 6 illustrates yet another embodiment of an RVSP configuration according to this disclosure.

FIG. 6 illustrates yet another method according to this disclosure ("Reverse walkaway VSP") for obtaining missing velocity information, also using a controlled downhole source below the monitoring well. In the case of reverse walkaway VSP, the depth interval between the bottom of the log and the lateral well contains no velocity information. Thus, yet again, a guess (educated or not) needs to be made. As shown in FIG. 6, the proposed geometry for interrogation of the previously unknown zone is to use a controlled downhole source 270 below the monitoring well 220 (i.e. reversing the survey geometry) containing the receivers 230 but emitting controlled waves in various locations along the treatment well 200 trajectory to produce a 'reverse' walkaway VSP. According to this configuration, here again, one could obtain first arrivals in the reverse walkaway VSP which information can be used as input: (a) to add velocity information in the initially unknown zone, (b) to calibrate lateral continuity (or lack thereof) of the 'nearby' acoustic impedance log, (c) to calculate a synthetic seismogram, or (d) to calibrate the surface seismic data. As a person of skill in the art appreciates, the walkaway VSP approach may generally yield data from shots along a single azimuth, whereas the offset VSP approach may be designed to yield data from shots covering many azimuths.

Figure 7:
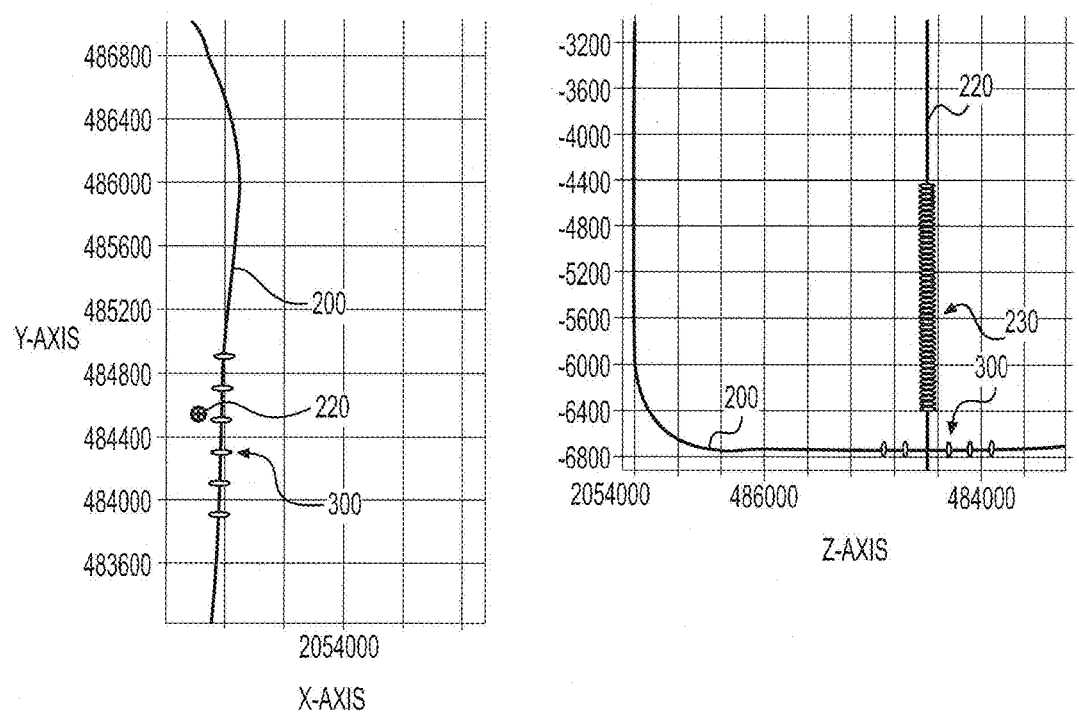
FIG. 7 provides a map and cross-section views of an embodiment of a zero-offset RVSP configuration according to this disclosure.
Figure 8:
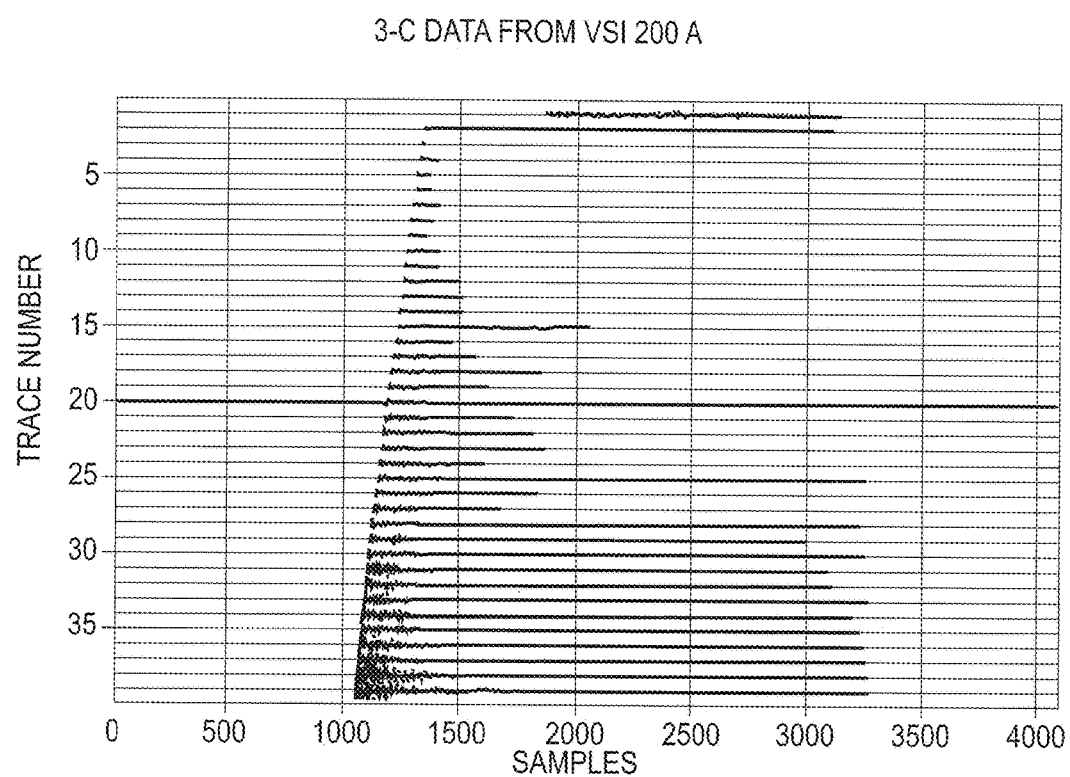
FIG. 8 is a graph of data acquired in accordance with an embodiment of a method according to this disclosure using the RVSP configuration of FIG. 7.

FIGS. 7 and 8 relate to a zero-offset RVSP geometry example in accordance with this disclosure. FIG. 7 provides map and cross-section views of a zero-offset RVSP geometry. FIG. 8 is a graph of the resultant acquired zero-offset RVSP data. In accordance with the embodiment, perforation shots were fired at several locations 300 along the horizontal well 200. The data was recorded by a receiver array 230 in the monitoring well 220.

Figure 9A:
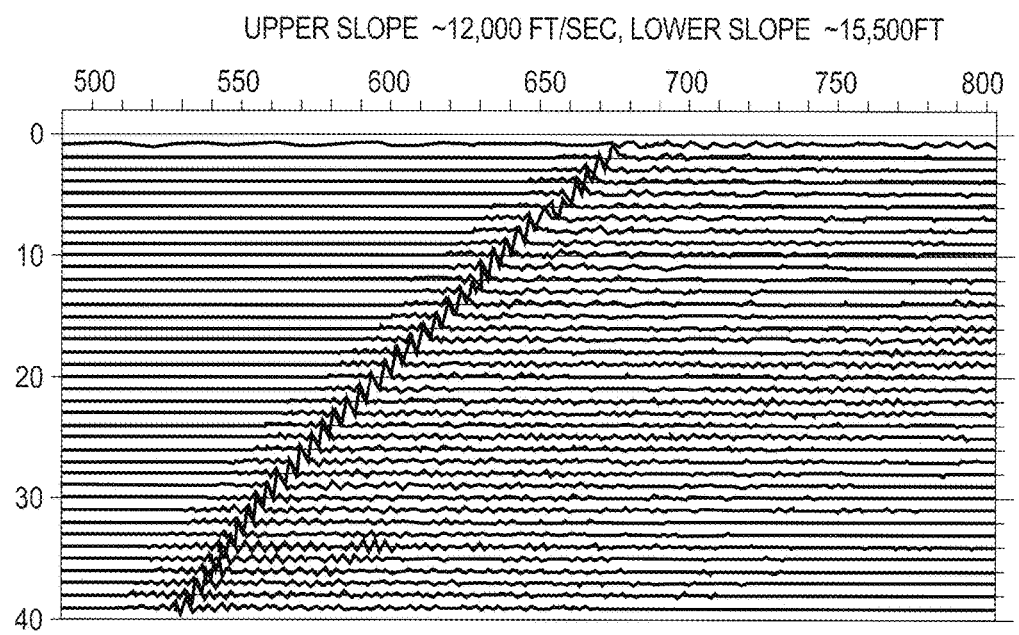
FIGS. 9a and 9b are graphs of data acquired in accordance with a walkaway RVSP geometry and method according to this disclosure.
Figure 9B:
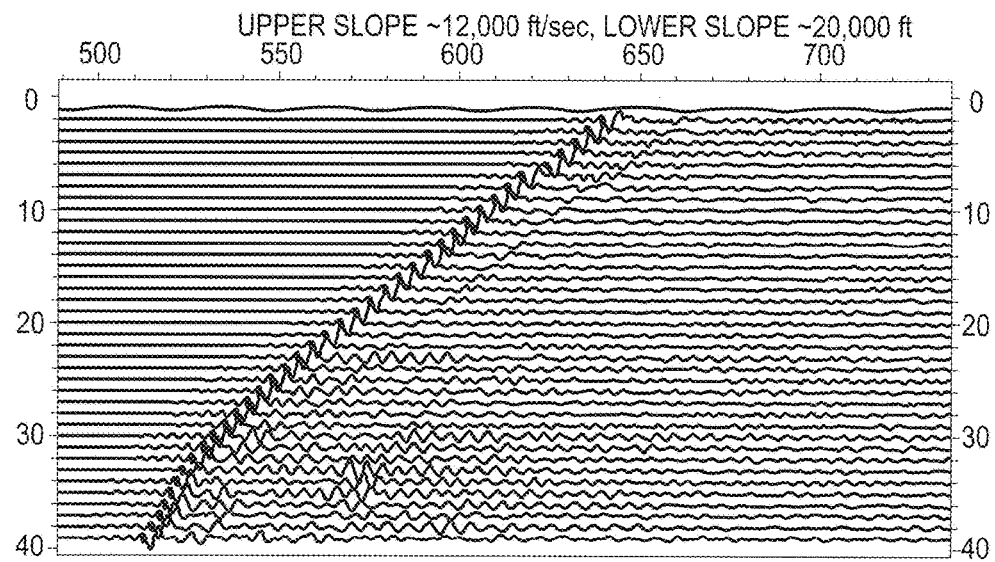
Figure 10:
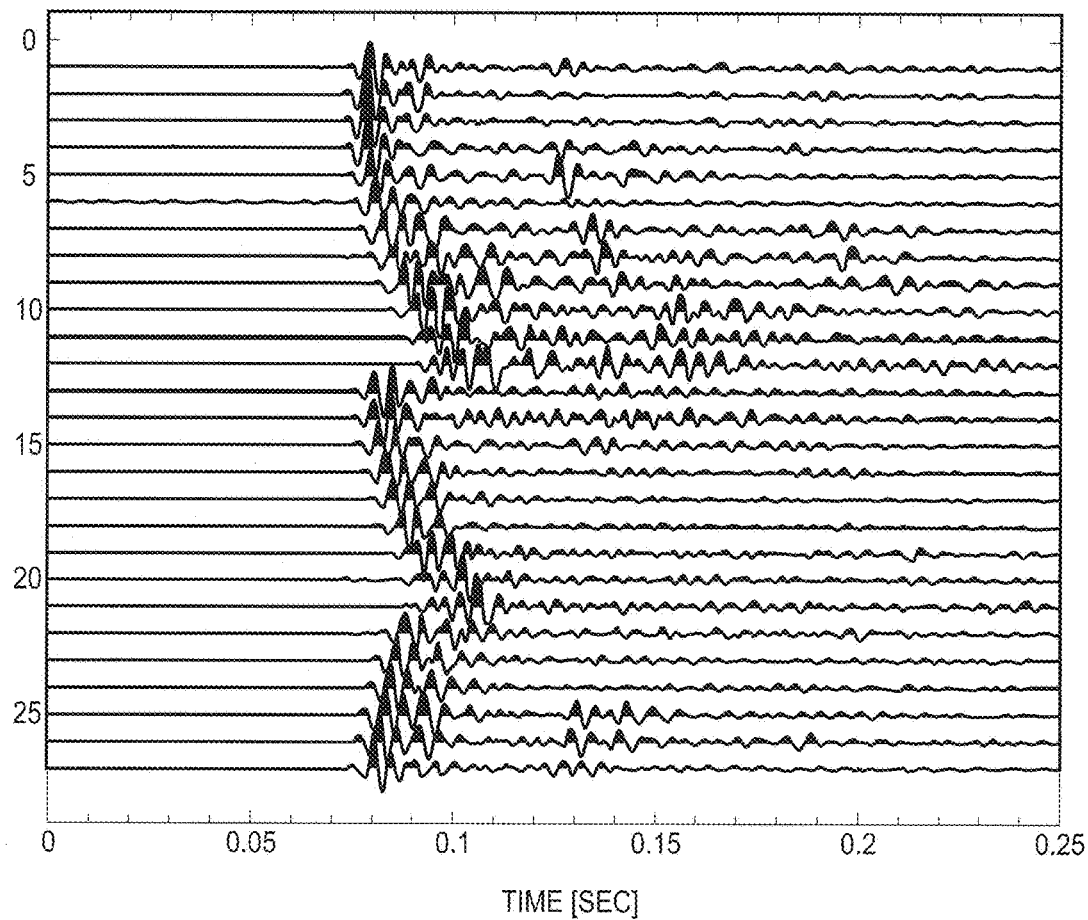
FIG. 10 is a graph of data acquired in accordance with a further embodiment of a method according to this disclosure.

FIGS. 9a, 9b and 10 relate to a walkaway RVSP geometry example in accordance with this disclosure, and are graphs of resultant acquired walkaway RVSP data. The walkaway data shown in FIGS. 9a and 9b was acquired during the same project that used the acquisition geometry shown in FIG. 7 (i.e. the data was acquired using controlled sources in a horizontal wellbore and recorded by a vertical monitoring array). The approximate differences in velocity are noted in the captions above the images. Specifically, the data shown in FIG. 9 illustrates that different RVSP datasets can be used to determine formation velocity as it varies along the treatment well. In other words, these data demonstrate that methods according to the disclosure can be used for discrimination of direct arrival travel time information which indicates velocity changes in the reservoir due to stimulation (note difference in the lower slope).

FIG. 10 shows walkaway RVSP data that was acquired using a horizontal geometry in which both the sources and receivers were deployed in different horizontal wells. In this particular project, the recording array was moved to three different positions in the monitoring well. The waveform data shown in FIG. 10 can be used to determine variations in the reservoir velocity by determining the times of the first arrival to the recording array and determining the velocity using the known distance between the source and receiver.

Figure 11A:
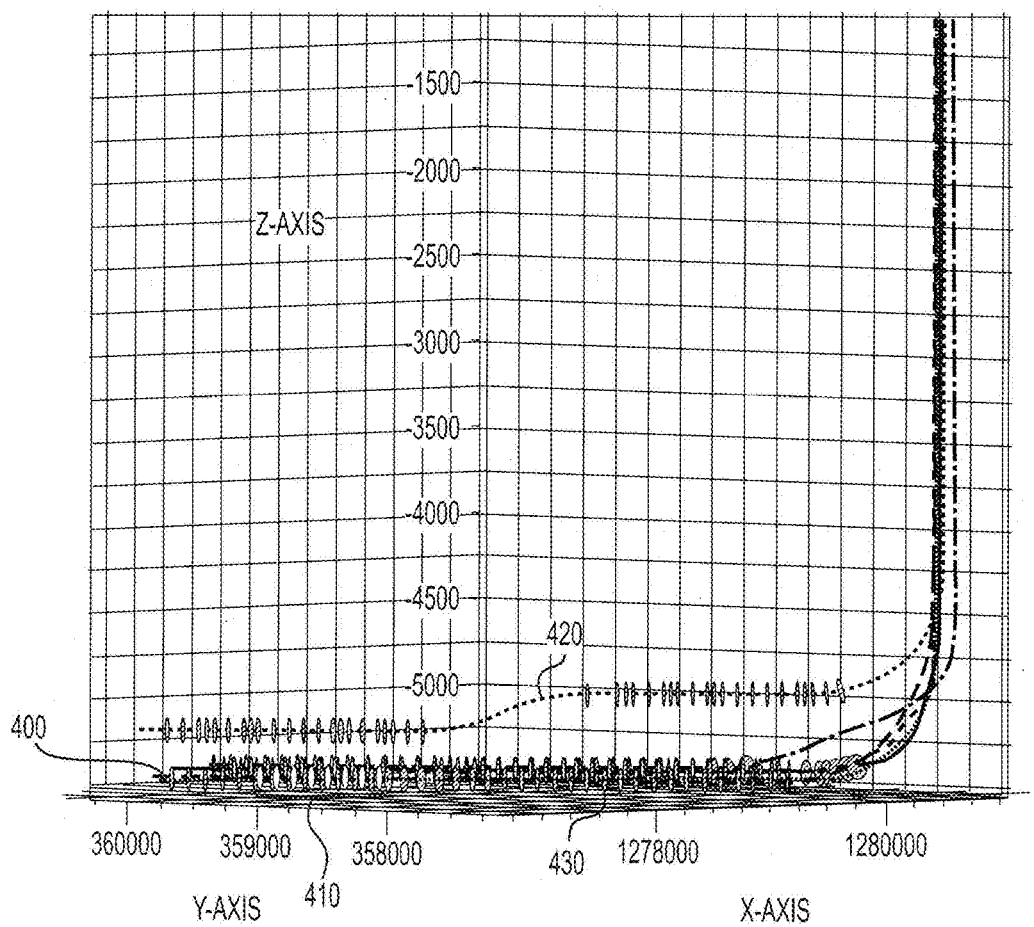
FIGS. 11 a-c are a pseudo cross-section, map view, and pseudo 3D view respectively of another embodiment of a source-receiver configuration according to this disclosure, which facilitates obtaining velocity information that would otherwise be obscured if using a traditional surface VSP configuration.
Figure 11B:
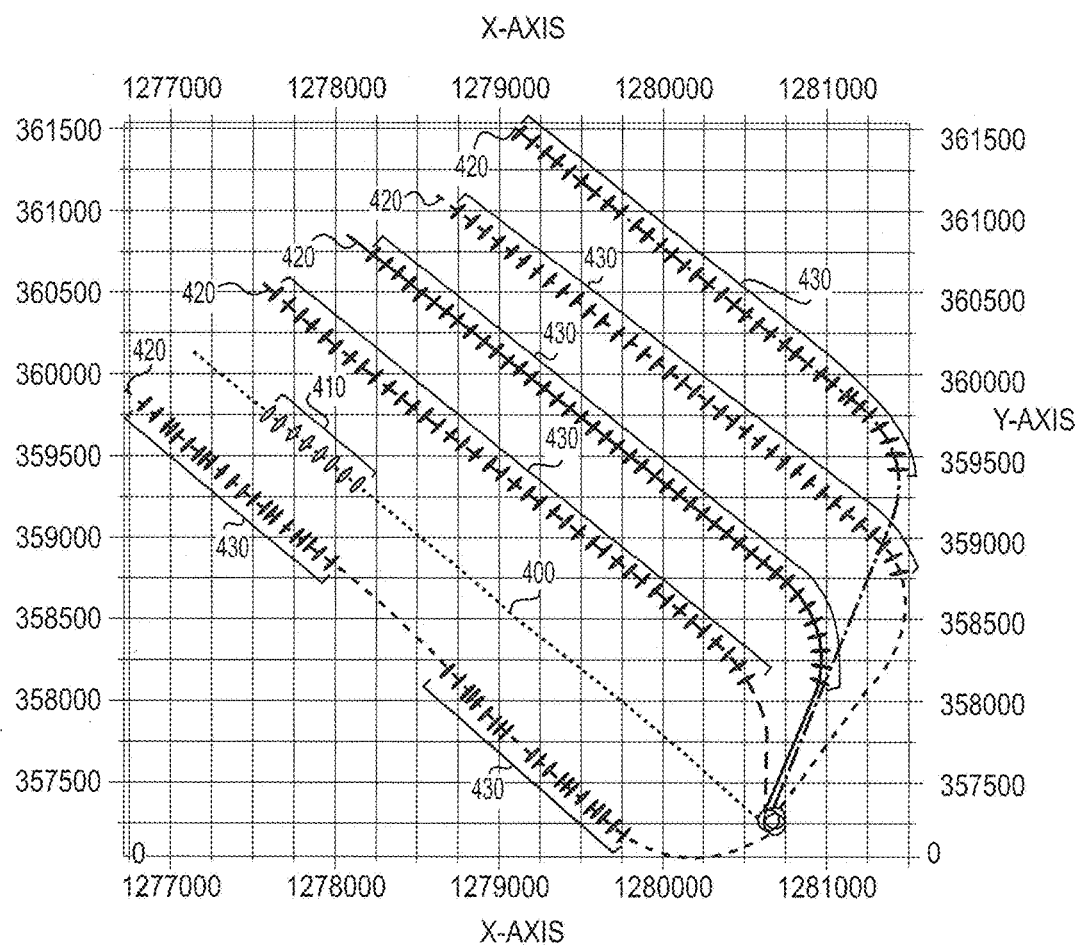
Figure 11C:
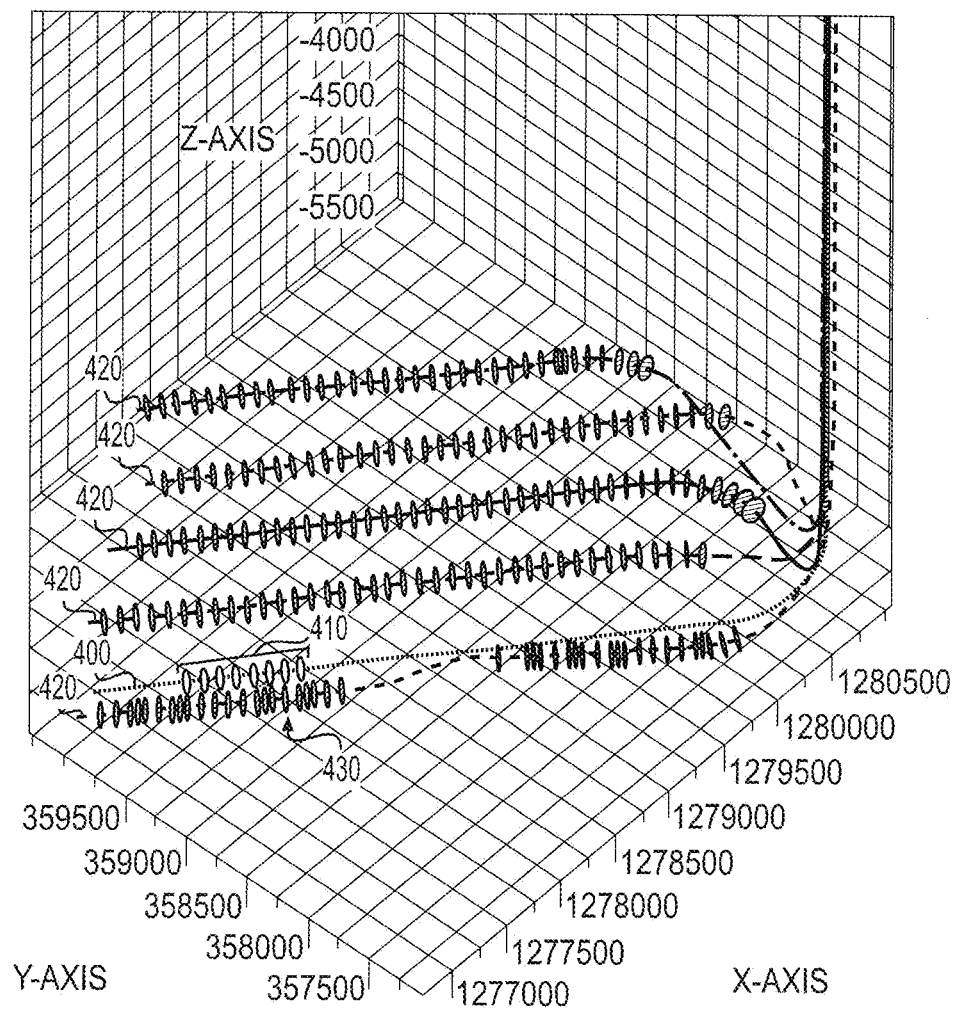

Methods according to this disclosure may utilize various downhole source-receiver configurations and are not limited to RVSP configurations to obtain data that would otherwise be obscured by traditional VSP configurations where the source is at the surface of the formation. FIGS. 11a-c are a pseudo cross-section, map view, and pseudo 3D view respectively of another embodiment of a source-receiver configuration according to this disclosure, which facilitates obtaining velocity information that would otherwise be obscured if using a traditional surface VSP configuration. In this embodiment, a tool 400 including an array of monitoring devices 410 is horizontally set among a plurality of horizontal treatment wells 420. Sources 430 can be in one or more of the treatment wells 420 or can be in the vicinity of the monitoring devices 410 in a volume around the treatment wells 420 (i.e. with no specific direction). In other words, whereas the tool 400 is horizontally set, the events (sources) can come from all azimuths, inclinations and distances. The flexibility of geometric configurations may permit 3D characterization of devices/sources/rocks. This is particularly suggested by FIG. 11c, which shows that not all wells are in the same plane. Further, as suggested in particular by FIG. 11b, methods in accordance with the disclosure may facilitate investigation of rock volumes over long distances, such as over the length of the horizontal well(s), or for example equal to the magnitude of the depth of the zone of interest, or for example up to 6000 feet (about 1829 meters), or up to 12,000 feet (about 3658 meters).

Methods: Downhole Uncontrolled Source.

In some embodiments, the downhole source is a microseismic event and the source-receiver configuration can assume any geometry including VSP and RVSP geometries, and the receivers may be at surface, downhole, or combinations thereof. The microseismic event may be natural or induced. For example the microseismic event may be an earthquake, or any noise associated with rock breaking. As another example, the microseismic event may be as a result of hydraulic fracturing. In some embodiments, the methods include recording seismic waves, which may be direct, indirect (reflected) or combinations thereof, at one or more receivers; and interpreting at least a subset of the recorded data to generate velocity information such as a velocity profile, and/or for information relating to subsurface structural features. For example, the data may be interpreted for information relating to rock properties, reservoir properties, or stratigraphy.

Although certain seismic waves generated from microseismic events have previously been gathered, this previous methodology of study has been limited to estimating the location and direction of the event. To date, it seems that there are no actual uses of a microseismic event as a seismic source to assist in the interpretation of subsurface features and reservoir properties in the oil and gas exploration field beyond estimating the location and direction of the microseismic event.

For example, FIGS. 12a-f and 13a and b illustrate an embodiment of how microseismic events may be used as sources to provide information relating to substructural features. According to the illustrated embodiment, microseismic events are induced at different distances from a receiver array. Analysis of the spectral content of the microseismic events can provide qualitative information relating to the hydrocarbon content of the formation.

Figure 12A:
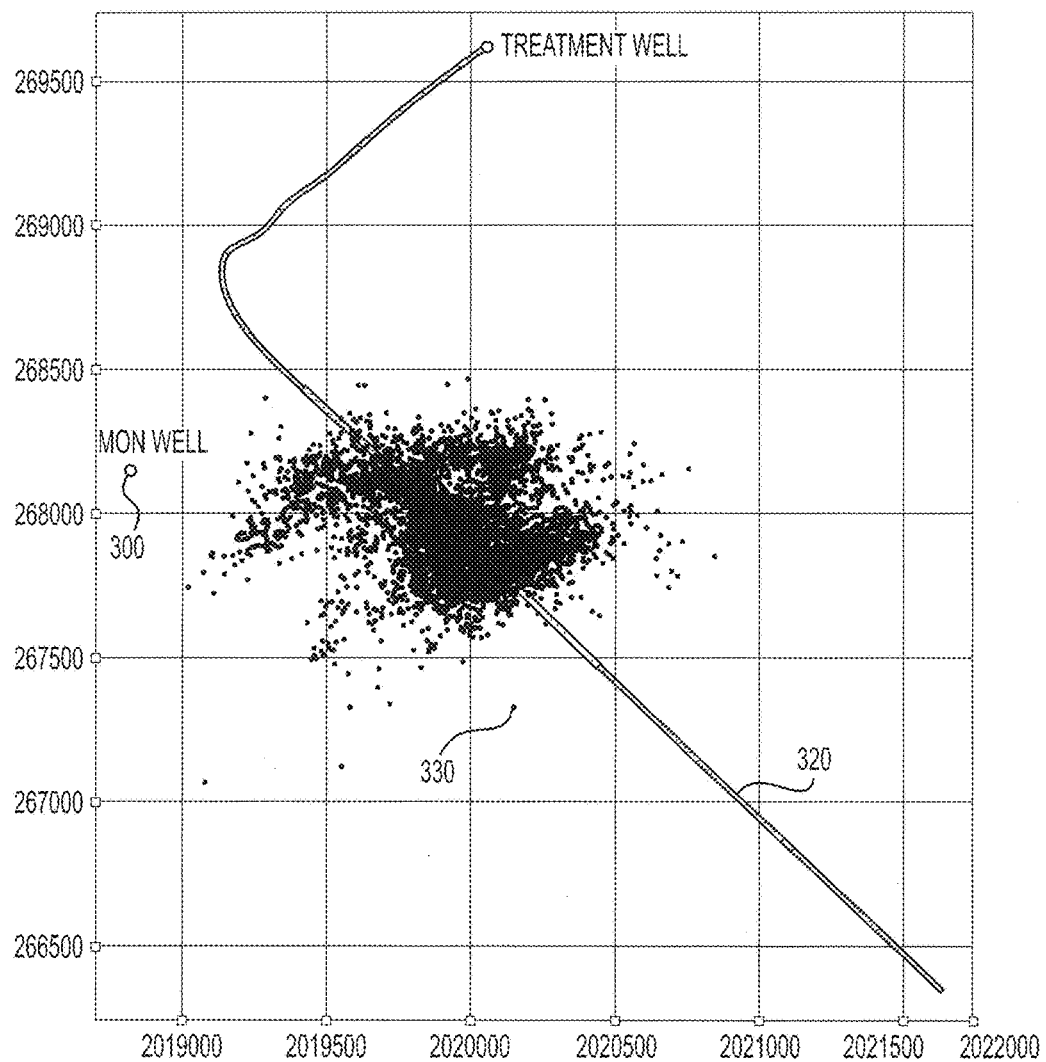
FIGS. 12 a-f illustrate an embodiment according to this disclosure where sets of microseismic events are induced to obtain qualitative information relating to the hydrocarbon content of the formation under investigation.
Figure 12B:
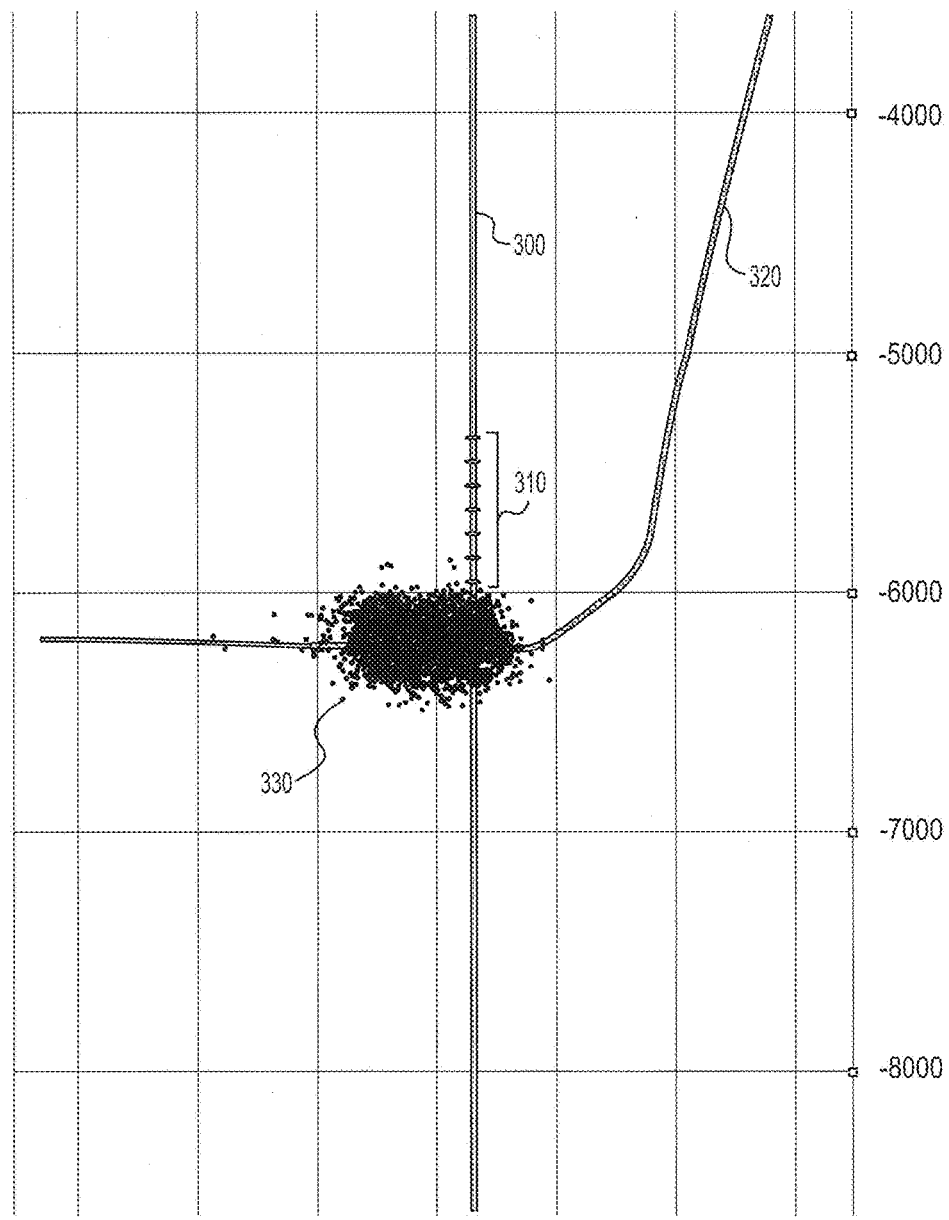
Figure 12C:
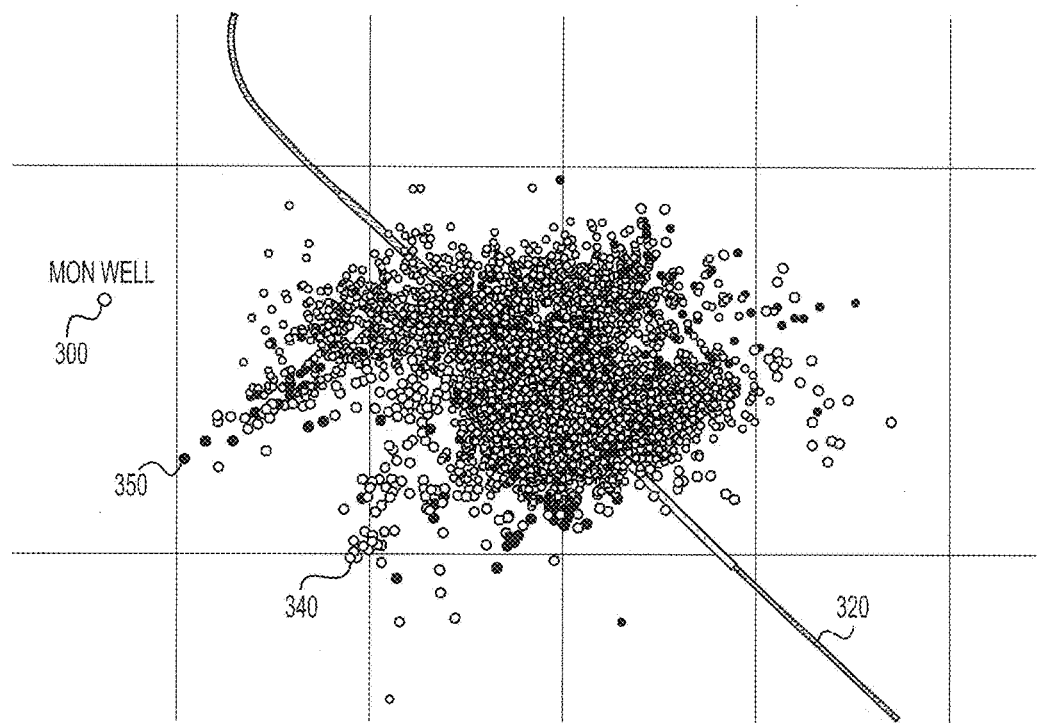
Figure 12D:
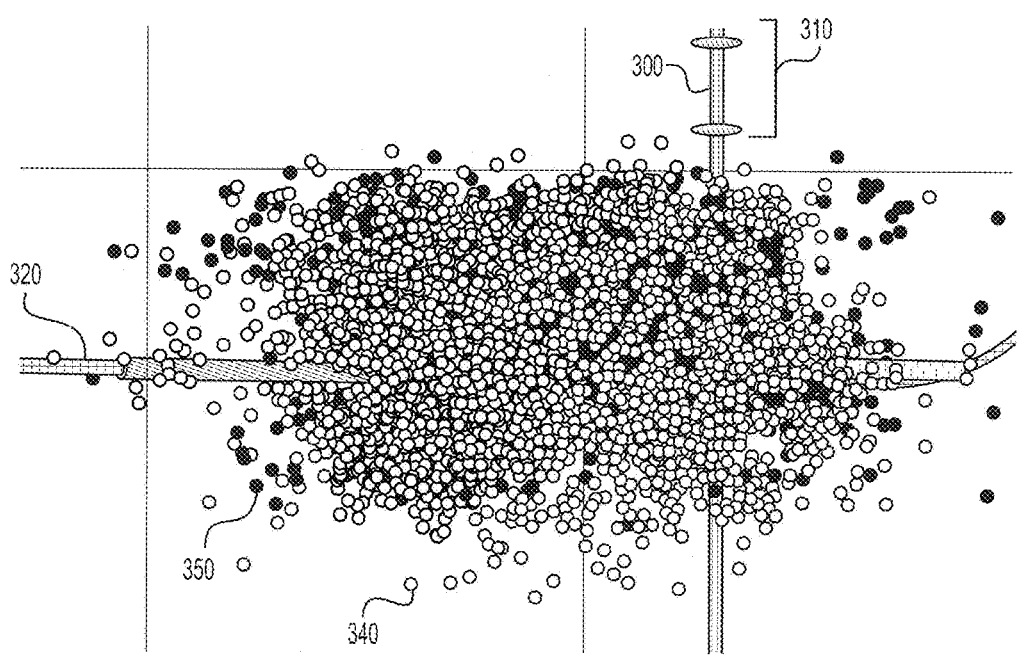
Figure 12E:
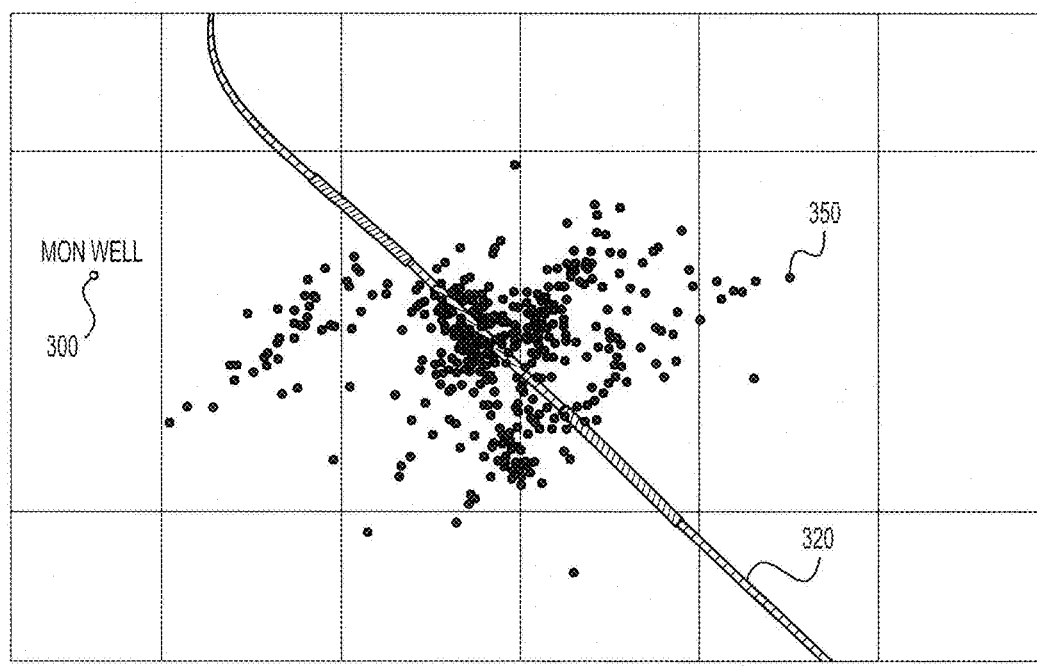
Figure 12F:
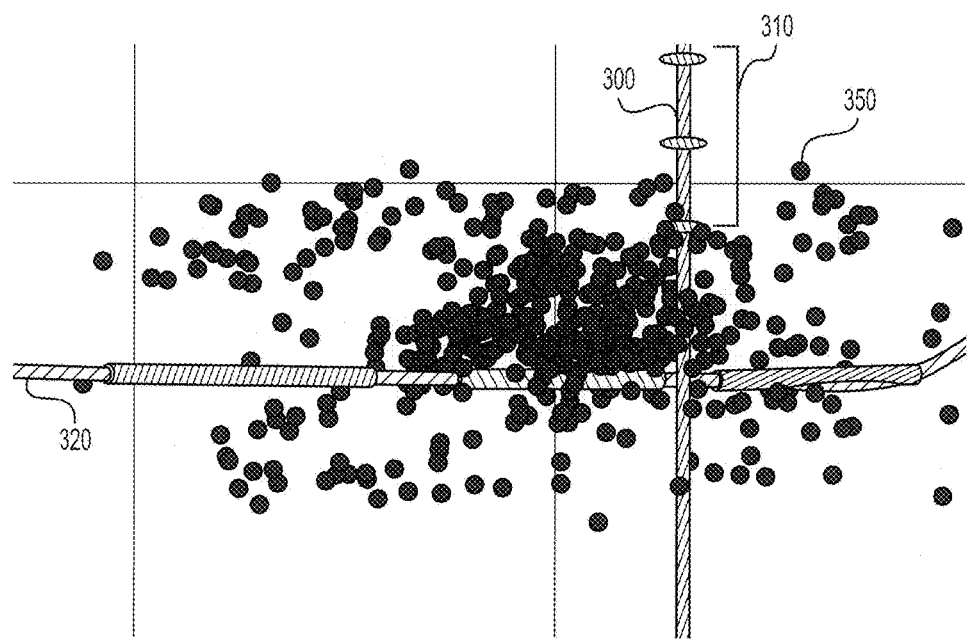

More specifically, FIGS. 12a and b show a plot of positions of a vertical monitoring well 300 including seismic receivers 310 (not shown in FIG. 12a) and the stages (4-6) of a treatment well 320. The left pane of FIG. 12a shows a map view of well geometry while the right pane shows a cross-sectional view. Dots 330 represent microseismic events recorded during stage 5 of a hydraulic simulation project. FIGS. 12 c and d are map and cross-section close-up views respectively of the positions of the seismic receiver array 310 (not shown in FIG. 12c) in the vertical well 300 and stage 5 of the treatment well 320. Dots 340, 350 represent microseismic events induced by the stimulation treatment that lasted 3 hours and six minutes. Dots 350 represent events that occurred in the last 32 minutes of stimulation. FIGS. 12 e and f are map and cross-section close-up views respectively of microseismic events created by hydraulic fracturing of stage 5 of the treatment well 320. The dots 350 represent all events that occurred in the last 32 minutes of stimulation.

Figure 13A:
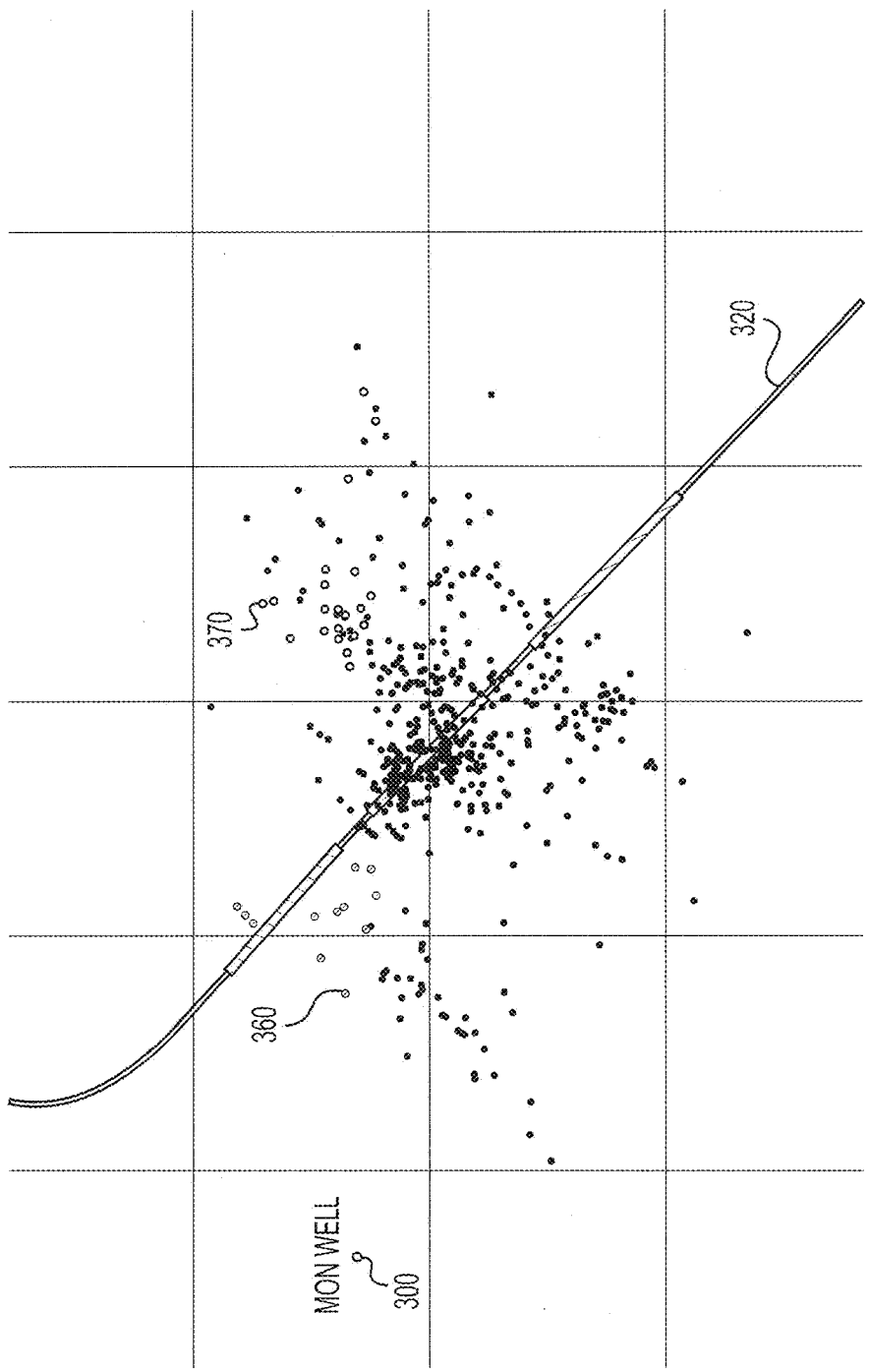
FIGS. 13 a and b are a close-up view of microseismic events of FIGS. 12 a-f selected for spectral analysis.
Figure 13B:
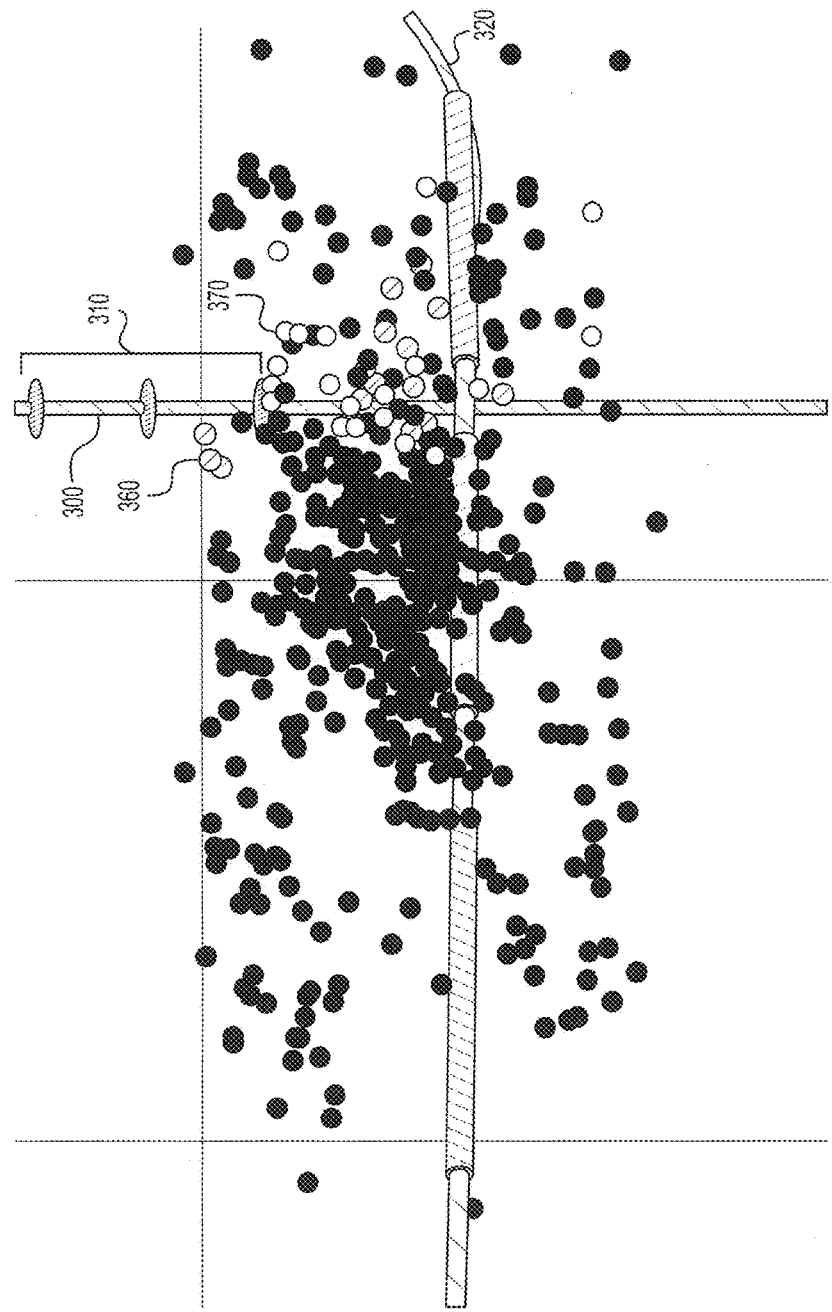

FIGS. 13a and b are close-up views of microseismic events selected for spectral analysis based on their positions relative to the receiver array 310 and the bulk of all seismic events induced during the stage 5 of treatment. The locations of the events selected for analysis are generally distributed near the center of the overall vertical distribution of events.

Figure 14A:
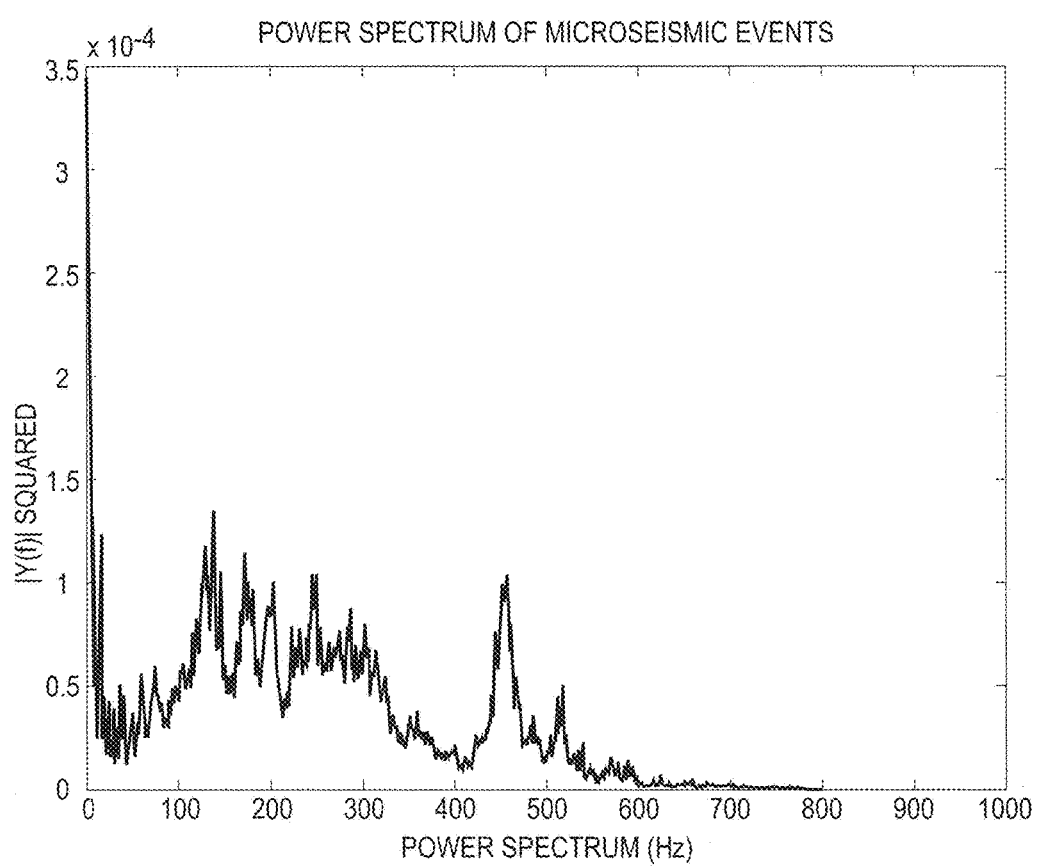
FIGS. 14 a and b are frequency spectra generated from data obtained by receivers recording seismic signals from the selected microseismic events shown in FIGS. 13a and 13b.
Figure 14B:
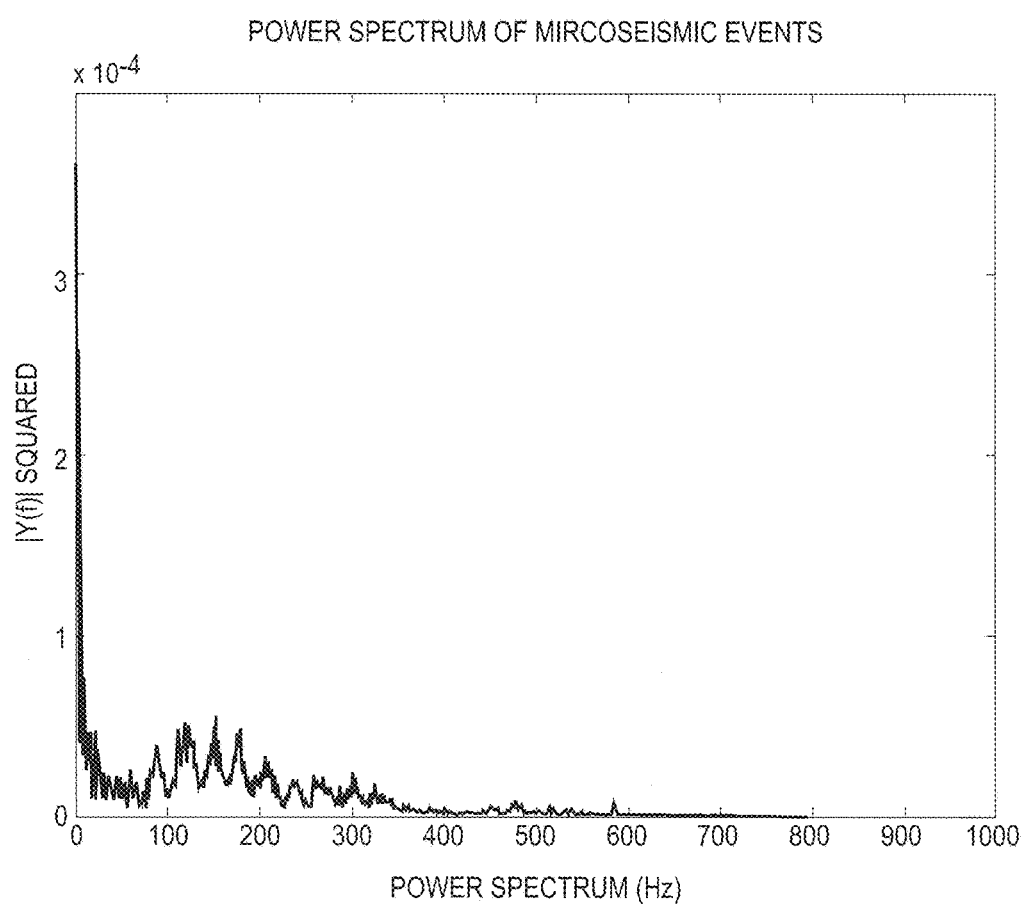

FIGS. 14a and b show the results of the spectral analysis of the two groups of seismic events induced during the latter part of the stage 5 treatment. In this analysis, the individual microseismic events are treated as separate sources whose waveforms are analyzed for spectral content. The plot in FIG. 14a shows the total power spectra for events on the near side of the treatment zone and closest to the receiver array (dots 360 in FIGS. 13a and b). The plot in FIG. 14b shows the total power spectra for events on the far side of the frac and farthest from the receiver array (dots 370 in FIGS. 13a and b). The spectra of events on the far side of the treatment zone (FIG. 14b) show a clearly reduced spectral power compared to those on the near side of the treatment zone (FIG. 14a), which indicates that the seismic waveforms of events on the far side of the treatment zone traveled through more hydrocarbon-filled fractures. For the far events, the spectral power frequencies greater than 325 Hz are diminished by hydrocarbon content in the heavily fractured zone of the reservoir stimulation.

As another example, microseismic events can be used as the source in lieu of (or in addition to) the controlled source in the downhole controlled source methods described below.

While the detailed description has been made with respect to a limited number of embodiments, those skilled in the art, having the benefit of this disclosure, will appreciate numerous modifications and variations there from. For example, while the specification refers to downhole receivers monitoring downhole sources, variations/configurations are possible among the following elements (unless explicitly stated otherwise): (a) source depth: shallow, deep, surface; (b) source nature: controlled P, controlled S, uncontrolled (i.e. natural occurrence such as microseism, purely explosive, etc.; (c) monitoring device: single/multiple, in one or several well(s) deep/shallow/surface. As an example, other RVSP geometries (relating to the variety of VSP geometries) are also within scope of this disclosure, as well as any configuration of receivers and source that facilitate acquiring velocity information that is generally obscured in traditional surface VSP approaches. As another example, while RVSP geometries have been discussed with respect to using a controlled source, microseismic events may also be used as the source in these methods. As yet another example, while the RVSP geometries may be achieved by using a vertical monitoring well and a horizontal treatment well with source located therein as illustrated in the Detailed Description, other implementations are also within scope of this disclosure. It is intended that the appended claims cover such modifications and variations as fall within the true spirit and scope of this disclosure.

What is claimed is:

1. A method comprising:
    using microseismic events as seismic sources by inducing, via a lateral wellbore of a treatment well, at least one first microseismic event having a first spectral frequency content and inducing at least one second microseismic event having a second spectral frequency content;
    recording data relating to seismic waves generated by the microseismic events at at least one receiver positioned in a wellbore of a monitor well at a depth that is less than corresponding depths of the microseismic events wherein the at least one first microseismic event is closer to the at least one receiver than the at least one second microseismic event; and
    interpreting at least a portion of the seismic data for spectral power of the seismic waves generated by the microseismic events as located between the microseismic events and the at least one receiver, the interpreting comprising comparing the spectral power of the first spectral frequency content with the spectral power of the second spectral frequency content for qualitative information relating to hydrocarbon content based on hydrocarbon content diminishing spectral power.

2. A method according to claim 1 wherein comparing the spectral power of the first spectral frequency content with the spectral power of the second spectral frequency content for qualitative information relating to hydrocarbon content based on hydrocarbon content diminishing spectral power comprises comparing at frequencies greater than approximately 325 Hz.

3. A method according to claim 1 wherein comparing the spectral power of the first spectral frequency content with the spectral power of the second spectral frequency content for qualitative information relating to hydrocarbon content based on hydrocarbon content diminishing spectral power comprises plotting power versus frequency.

4. A method according to claim 1 comprising, based at least in part on the comparing, identifying a fractured zone that comprises hydrocarbons.

5. A method according to claim 1 wherein the inducing at least one second microseismic event having a second spectral frequency content is via the lateral wellbore of the treatment well.

* * * * *